(12) United States Patent
Gresch

(10) Patent No.: US 10,932,415 B2
(45) Date of Patent: Mar. 2, 2021

(54) AGRICULTURAL CROP BALER WITH OSCILLATING SIDE WALLS

(71) Applicant: Deere & Company, Moline, IL (US)

(72) Inventor: Valentin Gresch, Ensheim (DE)

(73) Assignee: Deere & Company, Moline, IL (US)

( * ) Notice: Subject to any disclaimer, the term of this patent is extended or adjusted under 35 U.S.C. 154(b) by 236 days.

(21) Appl. No.: 16/145,138

(22) Filed: Sep. 27, 2018

(65) Prior Publication Data

US 2019/0090429 A1 Mar. 28, 2019

(30) Foreign Application Priority Data

Sep. 27, 2017 (DE) .......................... 102017217221.5

(51) Int. Cl.
| | | |
|---|---|---|
| *A01F 15/00* | (2006.01) | |
| *A01F 15/04* | (2006.01) | |
| *A01F 15/08* | (2006.01) | |
| *A01F 15/14* | (2006.01) | |
| *B30B 9/30* | (2006.01) | |

(52) U.S. Cl.
CPC ............ *A01F 15/005* (2013.01); *A01F 15/04* (2013.01); *A01F 15/046* (2013.01); *A01F 15/0825* (2013.01); *A01F 15/148* (2013.01); *B30B 9/3007* (2013.01); *B30B 9/3078* (2013.01)

(58) Field of Classification Search
CPC .... A01F 15/046; A01F 15/0825; A01F 15/02; A01F 15/04; A01F 15/00; A01F 15/005
See application file for complete search history.

(56) References Cited

U.S. PATENT DOCUMENTS

| | | | | |
|---|---|---|---|---|
| 3,424,081 A | * | 1/1969 | Hoke | ................... A01F 15/0825 |
| | | | | 100/192 |
| 4,788,901 A | * | 12/1988 | Klinner | .................... A01F 15/02 |
| | | | | 100/100 |
| 2012/0325943 A1 | * | 12/2012 | Levy | ....................... B29B 17/02 |
| | | | | 241/24.1 |
| 2014/0224135 A1 | * | 8/2014 | Van Amstel | ............ A01F 15/04 |
| | | | | 100/3 |
| 2016/0088798 A1 | | 3/2016 | Lang et al. | |

(Continued)

FOREIGN PATENT DOCUMENTS

| | | |
|---|---|---|
| DE | 10351861 A1 | 6/2005 |
| EP | 0273067 A2 | 7/1988 |
| EP | 0346586 A2 | 12/1989 |

(Continued)

OTHER PUBLICATIONS

Unpublished application No. DE102017207347.0, filed May 2, 2017, Gresch, et al.

(Continued)

*Primary Examiner* — Teresa M Ekiert
*Assistant Examiner* — Sarkis A Aktavoukian
(74) *Attorney, Agent, or Firm* — Hanley, Flight & Zimmerman, LLC

(57) ABSTRACT

In one embodiment, an agricultural crop baler comprising: a supporting frame; a pressing chamber configured to receive a stuffer, the stuffer compressing the crop into the pressing chamber; and at least one positionally adjustable side wall forming part of the pressing chamber, the side wall being supported by the supporting frame and configured to vibrate upon movement of the stuffer.

20 Claims, 2 Drawing Sheets

(56) References Cited

U.S. PATENT DOCUMENTS

2017/0013782 A1\* 1/2017 Kindt .................. A01F 15/0825

FOREIGN PATENT DOCUMENTS

| EP | 0803183 A1 | 10/1997 |
| EP | 1795065 A1 | 6/2007 |
| EP | 2022319 A1 | 2/2009 |
| WO | 2011/039140 | 4/2011 |

OTHER PUBLICATIONS

Search Report issued in counterpart application No. EP18195714.3, dated Mar. 18, 2019 (5 pages).

\* cited by examiner

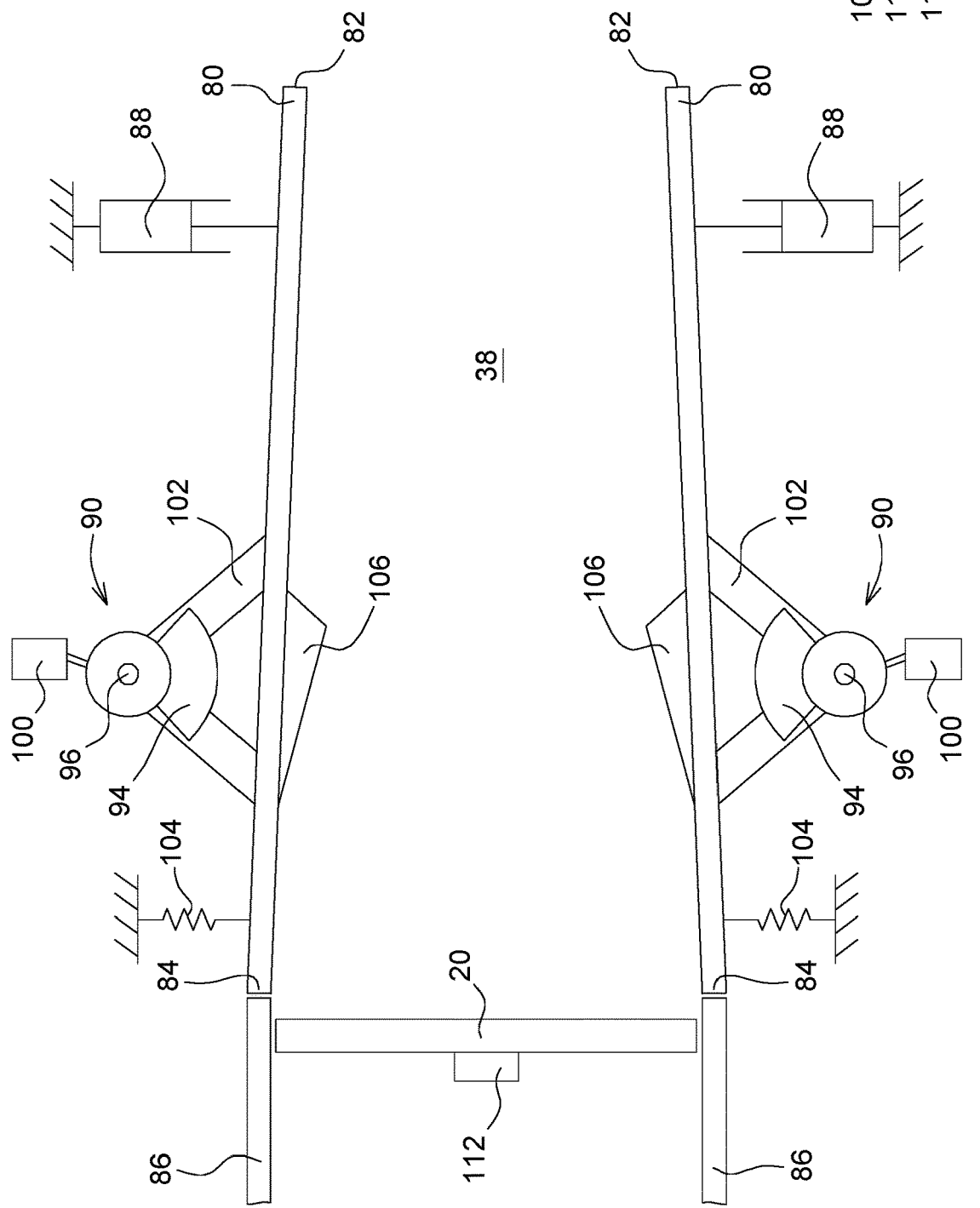

AGRICULTURAL CROP BALER WITH OSCILLATING SIDE WALLS

RELATED APPLICATIONS

This document claims priority based on German Patent Application No. 102017217221.5, filed on Sep. 27, 2017, which is hereby incorporated by reference into this application.

TECHNICAL FIELD

The present disclosure relates to an agricultural crop baler with a supporting frame, a pressing chamber with positionally adjustable side walls being supported thereon, and the crop to be pressed being able to be supplied thereto by a stuffer moving in a reciprocating manner.

BACKGROUND

Square balers are used for harvesting agricultural harvested crops, such as hay, silage or straw. The square baler is pulled by a tractor and mechanically driven via a power take-off shaft. The harvested crops are generally pre-compressed in a pre-compression chamber and subsequently compressed in the slightly converging pressing chamber by a stuffer operating in a reciprocating manner against the already existing bale. Such balers may also be used to compress other material (for example waste) into bales.

The side walls and the upper wall of the pressing chamber in this case are generally designed as steel plates reinforced with longitudinal members (see for example European Patent Application No. 0 346 586 A2). The floor of the pressing chamber is, however, generally fixedly connected to the supporting frame of the press. The side walls and optionally the upper wall is pivotably connected in the front region of the pressing chamber to the frame of the square baler, so that the side walls may be pivoted laterally and optionally the upper wall may be pivoted upwardly and downwardly. In the rear region of the square baler, the walls are connected or to the frame of the square baler via hydraulic cylinders. Via these hydraulic cylinders, the walls are pressed against the harvested crops, i.e. the bale which is being formed. As a result, surface forces acting on the sides of the bale are produced. These forces act statically and, together with the pressing force of the stuffer, permit a compression of the harvested crops.

Depending on the type of harvested crops, different pressures are applied to the walls. Thus, hydraulic pressure is operated in the case of silage at 5-40 bar, in the case of hay at 60-150 bar and in the case of straw at 100-180 bar. For example, in straw, bale densities of approximately 160-200 kg/m$^3$ may be achieved. However, the density distribution inside the bale is generally not uniform due to the physical properties of stalk crops. The greatest densities are achieved on the bale upper face and/or lower face, since the bale is held together there by the binding twine. In the interior of the bale, however, the density is generally significantly less.

European Patent Application No. 0 803 183 A1 discloses a baler with a first compression chamber in which the harvested crops are compressed by a stuffer in the above-described conventional manner. Subsequently, the bale is transferred into a second compression chamber in which it is subjected to a constant pressure by a further stuffer. The second stuffer may be set in an oscillating motion by a vibrator to promote the consolidation of the material in the second compression chamber. This baler is of relatively costly construction due to the second compression chamber.

SUMMARY

Various aspects of examples of the present disclosure are set forth in the claims. In one embodiment, an agricultural crop baler comprising: a supporting frame; a pressing chamber configured to receive a stuffer, the stuffer compressing the crop into the pressing chamber; and at least one positionally adjustable side wall forming part of the pressing chamber, the side wall being supported by the supporting frame and configured to vibrate upon movement of the stuffer.

In another embodiment, A method for baling an agricultural crop, the method comprising: moving an agricultural baler across a crop field, the baler having a supporting frame, a pressing chamber having at least one side wall and a stuffer; actuating the stuffer to compress crop within the pressing chamber; and actuating the least one side wall upon movement of the stuffer, the side wall moving in a vibrating motion to promote compression of the crop within the pressing chamber.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 2 shows a plan view of the pressing chamber of the square baler of FIG. 1.

DETAILED DESCRIPTION

Figure 1:
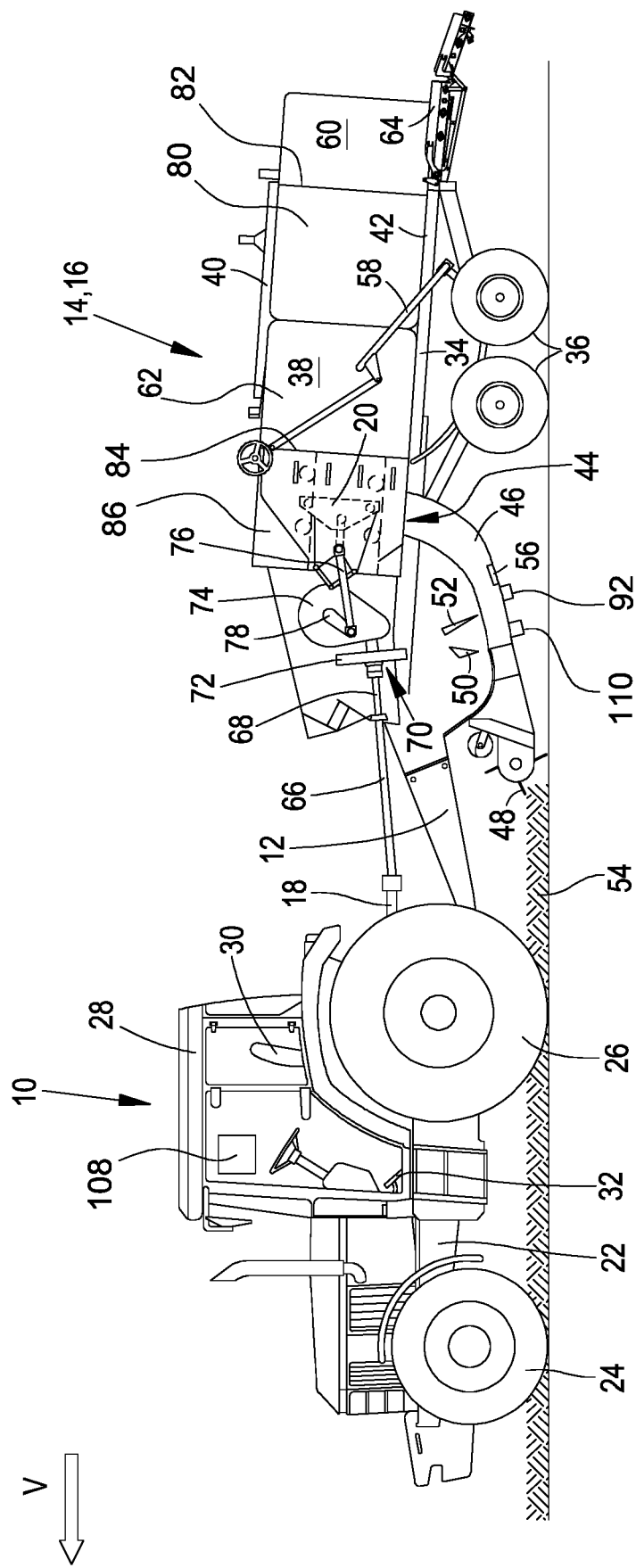
FIG. 1 shows a lateral view of a tractor with a square baler hitched thereon.

It is proposed that in addition to the static surface forces, dynamic forces (vibrations) may be applied to the side walls and optionally also to the upper wall and/or lower wall of the pressing chamber. As a result, by means of simple measures, firstly the density is increased in the lateral regions of the bale which produces a more uniform density distribution. Secondly, the overall density of the bale is also increased.

The side walls may be provided with, for example, wedge-shaped or tapered portions provided with any other shape, the shape thereof being able to be determined by means of a dynamic simulation or by tests, for example, which promotes the compression of the harvested crops. The side walls may be driven in opposing directions, which leads to the elimination or at least the reduction of the resulting oscillating motion of the frame. The side walls in their rear region in the direction of flow of the crop material may be positionally adjustable in a static manner by a first actuator and may be set in a vibrating motion by a second actuator which, mounted upstream of the first actuator relative to the direction of flow of the crop material, acts on the side walls.

The second actuator may comprise a mass oscillator and an electrically or hydraulically operated drive motor. The oscillation frequency and/or amplitude of the second actuator may be variable. The first actuator and/or the second actuator may be connected to a control unit which is able to be operated to control the contact force of the first actuator and/or the oscillation frequency and/or amplitude of the second actuator, depending on one or more of the following variables: the type of material to be pressed, which in particular is harvested crops, input by an operator or detected by sensor, the moisture of the material to be pressed detected by sensor, the pressing force of the stuffer, the mass throughput of the square baler which is measured or evaluated using predictive data (which, for example, may be determined according to the disclosure of US Patent Publication No. 2016/0088798 A1), the travelling speed, the type of pressing cycle, the position of the stuffer, the pressure of the first actuator, the designated target variables of the bale, such as bale length, bale weight, bale density, the current characteristic variables of the bale, such as current bale length, bale weight, calculated bale density and/or twine tension at the knotters. In contrast to the conventional regulation of pressing density, accordingly in the described system not only the static contact force of the side walls but also the dynamic contact force may be adjusted and/or regulated, based on machine and process parameters. The object of the regulation in this case, amongst other things, is to achieve the predetermined pressing density without exceeding the maximum pressing force of the stuffer. By the combination of dynamic and static compression, the pressing force required by friction on the inner face of the side walls may be reduced, for a predetermined degree of compression.

FIG. 1 shows an agricultural working vehicle 10 in the form of a tractor which pulls a load 14 in the form of a square baler 16 via a drawbar 12. A power take-up shaft 18 serves for driving movable elements of the load 14 and, in particular, of a stuffer 20. The working vehicle 10 is constructed on a chassis 22 which is supported on steerable front wheels 24 and drivable rear wheels 26 and supports a cab 28 in which an operator's seat 30 is located. By means of an input device 32 in the form of a pedal or a drive lever, which may predetermine a set speed without continuous operator interaction, in a manual operating mode the forward advance speed of the working vehicle 10 may be predetermined by an operator.

The square baler 16 serves for producing square bales. The square baler 16 comprises a frame 34 which is supported on ground support wheels 36 designed as a tandem undercarriage. The drawbar 12 is attached to the frame 34, said drawbar extending out of said frame to the front and being configured such that it may be attached to the working vehicle 10. An articulated shaft 66 of the square baler 16 is connected to the power take-up shaft 18 of the working vehicle 10 to provide power for driving different driven components of the square baler 16. A pressing chamber 38 in the form of a chamber of rectangular cross section is partially formed by a housing upper part 40 and a housing lower part 42, wherein the housing lower part 40 is provided with a crop material inlet 44, a curved supply channel 46 being attached thereto. The side walls 80 of the pressing chamber 38 extend from a front end 84 to a rear end 82 and are positionally adjustable by actuators 88 so that the cross section of the pressing chamber 38 may be altered. Via the adjustment of the actuators 88 the lateral contact pressure on the partial bale 62 and thus the pressing density may be varied. Mounted upstream of the adjustable side walls 80 are fixedly attached side walls 86, the stuffer 20 moving therebetween in a reciprocating manner. Moreover, it is possible that the upper housing upper part 40 is adjustable by an actuator 88 and optionally may be set in oscillation by a second actuator 90.

A supply device comprises a harvested crop pick-up device 48 in the form of a pick-up unit with an associated retainer, a compressor fork 50 and a loading fork 52. The harvested crop pick-up device 48 comprises a worm conveying toward the centre and is arranged upstream of the supply channel 46 to lift a swath 54 of harvested crops from the ground and to discharge it to the compressor fork 50 which serves to compress harvested crops in the supply channel 46 until a batch of preselected density has been collected in the supply channel 46 and is forced into the pressing chamber 38 by the loading fork 52 via the crop material inlet 44. A spring-loaded flap 56 is pivotably mounted at a front lower point of the supply channel 46, said flap pivoting according to the density of the harvested crops located in the supply channel 46 and via a sensor 92 indicating as soon as a desired pressed crop density is achieved in the supply channel 46 in order to supply power via a control unit 98 (see FIG. 2) to an electrical control circuit which produces a corresponding drive connection which activates the loading fork 52, so that it moves the batch of harvested crops into the pressing chamber 38. For clarity, directional information such as "front" and "rear" always refer to the forward direction V of the working vehicle 10 and the square baler 16 which extends in FIG. 1 from right to left.

When the batch of harvested crops has been introduced into the pressing chamber 38, the stuffer 20 is actuated by a suitable drive in a controlled sequence chronologically after the loading fork 52, in order to move the harvested crops to the rear into the pressing chamber 38 where they are compressed to form a stack. After the bale of compressed material has reached a preselected length, a needle assembly 58 is actuated for delivering binding twine, said needle assembly containing a plurality of curved needles in order to supply a plurality of twine strands to a corresponding number of knotters, not shown, which function such that they place lengths of twine around the preselected length of the stack in order to form a bale 60 which is ready for unloading, which occurs when the bale is forced out of the rear end region of the pressing chamber 38 by a partial bale 62, which is not yet ready, and when it increases in its length as new batches of harvested crops are forced into the pressing chamber 38.

The stuffer 20 is designed for a reciprocating motion in the pressing chamber 38 between a retracted position upstream of the crop material inlet 44 and a partially extended position above the crop material inlet 44 (shown in FIG. 1), from where it can move further to the rear until it strikes against a partial bale 62. The result of this movement of the stuffer 20 is that batches of harvested crops which are introduced from the supply channel 46 into the pressing chamber 38 are compressed against a stack of harvested crops, which includes the partially formed partial bale 62 and/or the complete bale 60. For careful depositing of the bale 60 on the ground, a depositing device 64 is attached to the rear end of the frame 34 as a rearward extension of the housing lower part 42.

The stuffer 20 is driven via the power take-up shaft 18 of the working vehicle 10, said power take-up shaft driving an input shaft 68 of the drive device 70 of the stuffer 20 via an articulated shaft 66. The input shaft 68 drives a flywheel 72 and via a gear mechanism 74 a crankshaft 78, the movement thereof being transmitted to the stuffer 20 via a connecting rod 76.

FIG. 2 shows a horizontal section through the pressing chamber 38 and the side walls 80 thereof, wherein the stuffer 20 in its rear reversal position is located between the fixedly attached side walls 86. The side walls 80 are coupled near the rear end 82 to first actuators 88 in the form of hydraulic cylinders 88, which extend between the side walls 80 and the frame of the square baler 16. The first actuators 88 are accordingly designed to act on the side walls 80 with a static pressure which is controllable via a valve device and the control device 98. It might also be conceivable to use only one first actuator 88 and to attach said actuator between the side walls 80, as disclosed in European Patent Application No. 0 346 586 A2.

Additionally, relative to the direction of flow of the material to be pressed, which extends in FIG. 2 from left to right, the side walls 80 are coupled upstream of the first actuators 88 to second actuators 90 (in the embodiment shown approximately at a third of the length of the side walls 80, located closer to the front end 84 than the rear end 82) which are configured to exert dynamic forces (vibrations, shaking or oscillations) onto the side walls 80, wherein the oscillation frequency of the dynamic forces is greater than the frequency at which the stuffer 20 compresses the material in the pressing chamber 38. In the embodiment shown, the second actuators 90 are designed as mass oscillators, i.e. they comprise an eccentric mass 94 which by a motor 100, which may be operated hydraulically or electrically, is rotatable about a shaft 96 which is rigidly coupled to the side wall 80 via a strut 102. The shaft 96 or the strut 102 or the side wall 80 may be supported at any point by a spring 104 on the frame 34, in order to permit the oscillating movement of the side wall 80. A further resilient (spring) or rotatable (hinge or joint) connection may be provided between the first actuators 88 and the side walls 80, in order to isolate the first actuators 88 from the oscillating movement. It might also be conceivable to arrange the second actuators 90 between the first actuators 88 and the side wall 80. The masses 94 arranged on the two sides of the square baler 16 rotate synchronously and in opposing directions in order to produce as few vibrations as possible in the frame 34.

Accordingly, the side walls 80 are not only able to be subjected in the usual manner to a static pressure by the first actuators 88 which is controllable by the control unit 98 but are also able to be acted upon by the second actuators 90 with a dynamic pressure which acts as a sinusoidal oscillation, the amplitude and/or frequency thereof being controllable by the control device 98. The frequency of the actuator 90 is fixed by the rotational speed of the motor 100, wherein if required deviations from the natural frequency of the mass oscillator are taken into account or the natural frequency of the mass oscillator, for example, could be influenced by a further adjusting drive which is controlled by the control device 98 and which moves the mass 94 in the radial direction relative to the shaft 96. The amplitude of the actuator 90 may be fixed by the motor 100 which is able to be switched at least between a switched-on state and a switched-off state, but preferably is also able to be adjusted in a stepped or stepless manner in terms of rotational speed between a rotational speed of 0 and a maximum rotational speed. The frequency and amplitude could also be controlled, such that an electromagnetic or hydraulic drive which drives the side wall 80 in the manner of a loudspeaker is used as a second actuator 88.

In cooperation with wedge-shaped tapered portions 106 on the inner faces of the side walls 80 which are arranged adjacent to the second actuators 90, the oscillation or vibration of the side walls 80 produced by the second actuators 90 leads to a compression of the material (harvested crops) and additionally reduces the friction between the material and the side walls 80.

The control device 98 may control the static pressure of the first actuators 88 and/or the dynamic pressure (i.e. the amplitude and/or frequency of the oscillation) of the second actuators 90 depending on one or more variables. To this end, the operating parameters of the actuators 88, 90 may be input via the operator interface 108 or they may be set automatically by the control device 98. In this case the operating values of the actuators 88, 90 selected by the control device 98 may be displayed on the operator interface 108 and optionally monitored by the operator.

Thus, the type of crop to be compressed (for example wheat straw, maize straw, silage, hay) which is input by an operator via an operator interface 108 or detected by a suitable sensor (for example a camera with image processing) may be considered. Generally, both the static and the dynamic pressures are greater, the more solid or tough the material to be pressed. Therefore, in the case of straw the dynamic pressures will be greater than in the case of grass. Additionally, the moisture of the material to be pressed, which is detected by a sensor 110, may be considered. The moisture sensor 110, in contrast to that shown in FIG. 1, may be attached on the ground side in the region furthest to the front of the pressing chamber 38. According to the invention, measuring the moisture in the already-compressed material is simpler and more accurate than in the supply channel 46 where the harvested crops are still relatively loose. Generally, both the static and the dynamic pressures are greater, the drier the material to be pressed.

Moreover, the control device 98 may consider the pressing force of the stuffer 20 detected by a sensor 112 inserted in the drive train of the stuffer 20, and at least the dynamic pressures increase with the increased pressing force, whilst the static pressures may be regulated such that a desired pressing force is maintained or a maximum pressing force is not exceeded.

As further input variables for activating the first and/or second actuator 88, 90, the control device 98 may use the mass throughput of the square baler 16 and/or the driving speed thereof measured by a suitable sensor (for example for measuring the drive moment of the harvested crop pick-up device 48 or the compressor fork 50) or evaluated using predictive data (for example by a camera focussed on the swath and an image-processing system, see German Patent Application No. 103 51 861 A1, or data relative to the density of the swath stored in a previous operating process, see German Patent Application No. 10 2017 207 347 A1). At least the dynamic forces of the second actuator 90 are greater, the higher the throughput of the harvested crops.

Moreover, the control device 98 may consider target variables of the bale, such as bale length, bale weight and bale density, which may be input via the operator interface 108 and which are provided as input variables for activating the first and/or second actuator 88, 90. Also in this case, the dynamic forces of the second actuator 90 will rise with increasing target variables. For adjusting the first actuator 88, reference may be made to the prior art, for example European Patent Application No. 0 346 586 A2, WO 2011/039140 A1 and the documents cited therein. Additionally, the control device 98 may use current characteristic variables of the bale, such as the bale length detected by sensor, the bale weight and the bale density calculated using the operating parameters of the square baler 16, as input variables for activating the first and/or second actuator 88, 90. Also in this case, the dynamic forces of the second actuator 90 will rise with increasing characteristic variables. Similarly, the control device 98 may consider the twine tension at the knotters, as input variables for activating the first and/or second actuator 88, 90. The greater the twine tension, the greater the pressures of the two actuators 88, 90. Furthermore, the control device 98 may consider the pressure of the first actuator 88 as input variables for activating the second actuator 90. The greater the pressure of the first actuator, the greater the pressure of the second actuator 88 in order to compress the harvested crops effectively.

Further input variables of the control device 98 for activating the first and/or second actuator 88, 90 may be the type of pressing cycle, i.e. whether fresh material is and/or has been introduced by the loading fork 52 into the pressing chamber 38 or not. Immediately after the introduction of fresh material, in particular, the amplitude of the second actuator 90 may be larger than after a specific time period has passed after the material has been introduced, in order to compress the material rapidly, or after the introduction of new material the amplitude may be smaller than after a specific time period has passed after the material has been introduced, firstly in order to await the pressing action of the stuffer 20 and secondly to increase the amplitude and to compress the material more effectively by the vibration. Similarly, the control device may consider the position of the stuffer 20 and select the amplitude of the second actuator 90 to be at its largest when the stuffer 20 is in the region of the rear reversal point, since then it cooperates with the harvested crops and the harvested crops to be compressed are then able to be compressed particularly effectively by the oscillation produced by the second actuator 90. Accordingly, in an energy-saving manner the amplitude of the second actuator 90 may be smaller near the front reversal point of the stuffer 20. Alternatively, a reverse operation might also be conceivable. Thus, when the stuffer 20 is located at the rear reversal point, the rotational speed of the actuator 90 is reduced to reduce the force to be applied by the stuffer 20. Subsequently, the dynamic force produced by the actuator 90 is increased again for improved subsequent compression.

The invention claimed is:

1. An agricultural crop baler comprising:
   a supporting frame;
   a pressing chamber configured to receive a stuffer, the stuffer is configured to compress a crop in the pressing chamber; and
   at least one positionally adjustable side wall forming part of the pressing chamber, the at least one side wall supported by the supporting frame and configured to vibrate in response to the stuffer compressing the crop.

2. The agricultural crop baler of claim 1, wherein the at least one side wall includes a tapered portion.

3. The agricultural crop baler of claim 2,
   wherein the at least one side wall includes a first side wall and a second side wall, the first side wall and the second side wall are configured to vibrate in opposing directions.

4. The agricultural crop baler of claim 3,
   further including a first actuator and a second actuator, the first actuator is configured to adjust a position of at least one of the first side wall or the second side wall, the second actuator is configured to generate vibration of the at least one of the first side wall or the second side wall.

5. The agricultural crop baler of claim 4,
   wherein the first actuator is coupled to the at least one of the first side wall or the second side wall proximate a rear end of the at least one of the first side wall or the second side wall,
   wherein the first actuator is downstream of the second actuator relative to a direction of flow of the crop.

6. The agricultural crop baler of claim 4, wherein the second actuator includes a mass oscillator and a drive motor.

7. The agricultural crop baler of claim 4,
   wherein the second actuator has at least one of a variable oscillation frequency or a variable amplitude.

8. The agricultural crop baler of claim 4,
   further including a control unit coupled to the first actuator, wherein the control unit is configured to control a static pressure of the first actuator.

9. The agricultural crop baler of claim 8,
   further including a sensor couple to the agricultural crop baler, wherein the control unit controls the first actuator based on at least one of a characteristic of the crop, a signal from the sensor, and a characteristic of the agricultural crop baler.

10. The agricultural crop baler of claim 8, wherein the control unit controls the first actuator based on real time data including at least one of a pressing force of the stuffer, a throughput of the agricultural crop baler, moisture of the crop, a bale length, a bale weight, a bale density, a twine tension, a traveling speed of a working vehicle, a position of the stuffer, and the static pressure of the first actuator.

11. The agricultural crop baler of claim 9, wherein the characteristic of the crop includes at least one of moisture of the crop and a type of the crop.

12. The agricultural crop baler of claim 9, wherein the characteristic of the agricultural crop baler includes predetermined data including at least one of a pressing force of the stuffer, a throughput of the agricultural crop baler, a bale length, a bale weight, a bale density, or a twine tension.

13. The agricultural crop baler of claim 4,
    further including a control unit coupled to the second actuator, wherein the control unit is configured to control at least one of an oscillation frequency or an amplitude of the second actuator.

14. The agricultural crop baler of claim 13,
    wherein the control unit controls the second actuator based on at least one of a characteristic of the crop, a signal from a sensor coupled to the agricultural crop baler, and a characteristic of the agricultural crop baler.

15. The agricultural crop baler of claim 14,
    wherein the characteristic of the crop includes at least one of moisture of the crop and a type of the crop being bailed.

16. The agricultural crop baler of claim 14, wherein the control unit controls the second actuator based on real time data including at least one of a pressing force of the stuffer, a throughput of the agricultural crop baler, a bale length, a bale weight, a bale density, a twine tension, a traveling speed of a working vehicle, a position of the stuffer, and a static pressure of the first actuator.

17. The agricultural crop baler of claim 14, wherein the characteristic of the agricultural crop baler includes at least one of a pressing force of the stuffer, a throughput of the agricultural crop baler, a bale length, a bale weight, a bale density, or a twine tension.

18. A method for baling an agricultural crop, the method comprising:
    moving an agricultural baler across a crop field, the baler including a supporting frame, a pressing chamber including at least one positionally adjustable side wall and a stuffer;
    actuating the stuffer to compress the agricultural crop within the pressing chamber; and
    actuating the at least one side wall to vibrate in response to the stuffer compressing the agricultural crop.

19. The method for baling an agricultural crop of claim 18, further including:
adjusting a position of the at least one side wall using a first actuator; and
generating vibration of the at least one side wall using a second actuator.

20. The method for bailing an agricultural crop of claim 18, further including actuating the at least one side wall based on at least a characteristic of the agricultural crop, a signal from a sensor coupled to the agricultural crop baler, and a characteristic of the agricultural crop baler.

* * * * *